US009710972B2

(12) United States Patent
Sanders et al.

(10) Patent No.: US 9,710,972 B2
(45) Date of Patent: Jul. 18, 2017

(54) IMMERSION PHOTOGRAPHY WITH DYNAMIC MATTE SCREEN

(71) Applicant: Lucasfilm Entertainment Co. Ltd., San Francisco, CA (US)

(72) Inventors: Mike Sanders, San Francisco, CA (US); Kim Libreri, Fairfax, CA (US); Nick Rasmussen, San Francisco, CA (US); John Gaeta, Ross, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 21 days.

(21) Appl. No.: 14/483,865

(22) Filed: Sep. 11, 2014

(65) Prior Publication Data

US 2015/0348326 A1   Dec. 3, 2015

Related U.S. Application Data

(60) Provisional application No. 62/005,731, filed on May 30, 2014.

(51) Int. Cl.
  *G09G 5/00*  (2006.01)
  *G06T 19/00*  (2011.01)
  *H04N 5/265*  (2006.01)
  *H04N 5/275*  (2006.01)

(52) U.S. Cl.
  CPC ........... *G06T 19/006* (2013.01); *H04N 5/265* (2013.01); *H04N 5/275* (2013.01)

(58) Field of Classification Search
  None
  See application file for complete search history.

(56) References Cited

U.S. PATENT DOCUMENTS

| 6,919,892 | B1* | 7/2005 | Cheiky | ................... G06T 13/40 345/473 |
| 7,027,054 | B1* | 4/2006 | Cheiky | .................. H04N 5/262 345/473 |
| 8,298,079 | B2 | 10/2012 | Mori et al. | |
| 8,411,092 | B2 | 4/2013 | Sheblak et al. | |
| 8,427,471 | B2 | 4/2013 | Tsukizaki et al. | |
| 8,491,394 | B2 | 7/2013 | Fields et al. | |
| 8,824,861 | B2* | 9/2014 | Gentile | ..................... G06T 5/50 386/278 |
| 9,087,401 | B1 | 7/2015 | Zheng et al. | |

(Continued)

OTHER PUBLICATIONS

U.S. Appl. No. 14/571,017, "Non-Final Office Action", Apr. 22, 2016, 7 pages.

(Continued)

*Primary Examiner* — M Good Johnson
(74) *Attorney, Agent, or Firm* — Kilpatrick Townsend & Stockton LLP

(57) ABSTRACT

A method may include displaying, on one or more display devices in a virtual-reality environment, a visual representation of a 3-D virtual scene from the perspective of a subject location in the virtual-reality environment. The method may also include displaying, on the one or more display devices, a chroma-key background with the visual representation. The method may further include recording, using a camera, an image of the subject in the virtual-reality environment against the chroma-key background.

20 Claims, 11 Drawing Sheets

(56) References Cited

U.S. PATENT DOCUMENTS

| | | | |
|---|---|---|---|
| 9,142,024 B2* | 9/2015 | Sullivan | G06K 9/3216 |
| 9,244,924 B2 | 1/2016 | Cheng et al. | |
| 9,305,403 B2 | 4/2016 | Cabrita | |
| 2005/0099603 A1* | 5/2005 | Thomas | G03B 15/06 352/85 |
| 2009/0251460 A1* | 10/2009 | Dunnigan | G06T 15/50 345/419 |
| 2010/0007665 A1* | 1/2010 | Smith | G06T 13/40 345/473 |
| 2011/0164116 A1* | 7/2011 | Gay | G06T 19/006 348/47 |
| 2012/0086631 A1* | 4/2012 | Osman | A63F 13/12 345/156 |
| 2012/0105473 A1* | 5/2012 | Bar-Zeev | G06T 7/70 345/633 |
| 2014/0306995 A1* | 10/2014 | Raheman | G06T 19/006 345/633 |
| 2015/0054823 A1* | 2/2015 | Dzhurinskiy | H04N 5/2226 345/419 |
| 2015/0078621 A1* | 3/2015 | Choi | G09G 5/14 382/103 |
| 2015/0317765 A1 | 11/2015 | Haw | |

OTHER PUBLICATIONS

U.S. Appl. No. 14/571,017, "Notice of Allowance", Oct. 24, 2016, 6 pages.

* cited by examiner

IMMERSION PHOTOGRAPHY WITH DYNAMIC MATTE SCREEN

CROSS-REFERENCES TO RELATED APPLICATIONS

This application claims the benefit of U.S. Provisional Application No. 62/005,731 filed May 30, 2014, titled "Immersion Photography with Dynamic Matte Screen," which is hereby incorporated by reference for all purposes.

BACKGROUND

Conventionally, actors often perform in front of chroma-key backgrounds, commonly referred to as "green screens" or "blue screens." The contrast between an actor and a chroma-key background can be used to generate a matte image, which permits the actor's performance to be superimposed onto different backgrounds. For example, the performance of an actor captured on a soundstage in Los Angeles can be superimposed onto a background of a shot of outer space. By using chroma-key backgrounds in the manner described, actors can appear to be in different locales without being physically required to be at the locations.

BRIEF SUMMARY

In some embodiments, a method may be presented that includes displaying, on one or more display devices of a virtual-reality environment, a visual representation of a 3-D virtual scene from the perspective of a subject located in the virtual-reality environment. The method may also include displaying, on the one or more display devices, a chroma-key background with the visual representation. The method may further include recording, using a camera, an image of the subject in the virtual-reality environment against the chroma-key background.

In some embodiments, a system may be presented that includes a virtual-reality environment including one or more display devices, a camera, and a computer system. The computer system may include one or more processors and a memory device having instructions stored thereon which, when executed by the one or more processors, cause the one or more processors to perform operations including displaying, on one or more display devices of the virtual-reality environment, a visual representation of a 3-D virtual scene from the perspective of a subject located in the virtual-reality environment. The operations may also include displaying, on the one or more display devices, a chroma-key background with the video representation. The operations may additionally include recording, using a camera, an image of the subject in the virtual-reality environment against the chroma-key background.

In some embodiments, a non-transitory storage medium may be presented that includes instructions which, when executed by the one or more processors, cause the one or more processors to perform operations including displaying, on one or more display devices of the virtual-reality environment, a visual representation of a 3-D virtual scene from the perspective of a subject located in the virtual-reality environment. The operations may also include displaying, on the one or more display devices, a chroma-key background with the video representation. The operations may additionally include recording, using a camera, an image of the subject in the virtual-reality environment against the chroma-key background.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1B:
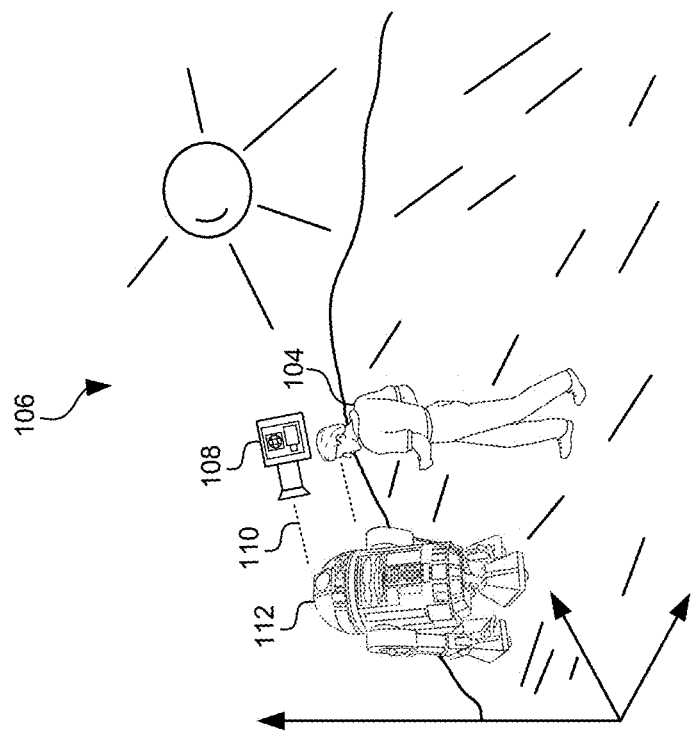
FIG. 1B illustrates a subject inserted into a 3-D virtual scene, according to some embodiments.

Described herein are embodiments for providing a subject (e.g., an actor) with an immersive photography experience within a virtual-reality environment. In some embodiments, a performance of the subject within the virtual-reality environment can be captured using a physical camera or some other image capture device. The captured performance of the subject may thereafter be inserted into or otherwise included in a rendered 3-D virtual scene. Such a 3-D virtual scene may be included as part of viewable content (e.g., a movie, television programming, video game, online video content) that may be presented to one or more viewers. For instance, an actor may perform within a virtual-reality environment that simulates a scene from a movie. His or her performance may be captured by one or more cameras directed or trained on the actor. The captured performance of the actor may then be composited with one or more digital objects and scenery to create a 3-D virtual scene for inclusion in a final production version of the movie to be shown to viewing audiences.

In order to provide an interactive and immersive experience during the performance of the subject, the virtual-reality environment can include one or more display devices configured to display elements of the 3-D virtual scene from the perspective of the location of the subject. Virtusal scenery, objects and characters can be displayed in front of or in proximity to the subject in order to elicit a more realistic performance response from the subject. For example, a virtual monster may be presented on the display devices of the virtual-reality environment. Because the monster is visible to the subject, the subject can adjust his or her performance accordingly. Illustratively, the subject can adjust his or her gaze such that it is aligned with the gaze of the monster. As a result, the performance of the subject can appear more natural relative to a performance where the actor is unable to see the monster and/or other parts of the 3-D virtual scene. In addition to interacting with other elements of the 3-D virtual scene, the subject may also be exposed to lighting that is consistent with the 3-D virtual scene rather than lighting produced in a typical physical setting that is often different from the 3-D virtual scene environment.

In some embodiments, the location of the subject can be tracked throughout a performance within the virtual-reality environment. In some embodiments, the 3-D virtual scene elements displayed on the display devices can be rendered in real time (or at interactive frame rates) as the location of the subject changes in order to maintain a correct perspective of the scene for the subject. Illustratively, if the subject moves closer to a particular display of the virtual-reality environment, certain objects of the 3-D virtual scene may be made larger on the displays. As a result, the subject may perceive that he or she is getting closer to the objects.

In some embodiments, to properly isolate the performance of the actor from the displayed elements of the 3-D virtual scene, a chroma-key background can be dynamically displayed on the display devices. The shape and/or location of the chroma-key background can be modified in real time (or at interactive frame rates) as the location of the subject changes relative to the location of the physical camera capturing the performance of the subject so as to only require a minimal amount of space on the display devices. In one aspect, the chroma-key background may be at least directly behind the subject from the perspective of a physical camera capturing the performance of the subject.

The chroma-key background may be presented in conjunction with the 3-D virtual scene over the display devices of the virtual-reality environment. In certain embodiments, the chroma-key background may be overlain upon the 3-D virtual scene such that the background covers a portion of the 3-D virtual scene directly behind the subject from the perspective of the physical camera. In other embodiments, the chroma-key background may replace a portion of the 3-D virtual scene directly behind the subject from the perspective of the physical environment. For example an actor can stand in the virtual-reality environment in a movie studio while images of robots and aliens are projected on screens that surround the actor, such that the actor feels as though they are in an alien environment actually interacting with CGI characters and/or objects. While shooting the movie scene, the actor can talk to the robotic/alien characters and freely move around the scene. At the same time, the computer system can track the actor's movements and dynamically resize the alien environment and characters as the actor moves around the scene. The computer system can also simultaneously project a green screen screen image on a portion of the projection screens so that the camera can capture the actor's performance against the green screen instead of having the recorded images of the actor blend into the alien background.

In this way, the subject can still view certain portions of 3-D virtual scene while the physical camera can capture the performance of the subject against a chroma-key background. In some instances, as the subject moves, the chroma-key background also is moved and/or changed such that different portions of the 3-D virtual scene are obscured by the chroma-key background over the performance. Likewise, the movement of the chroma-key background may also unobscure portions of the 3-D virtual scene not directly behind the subject.

In certain embodiments, the actual performance of the subject can then be inserted into the 3-D virtual scene and/or a motion capture of the performance of the subject can be used to drive a digital character in the 3-D virtual scene. Some embodiments may capture the performance of two different subjects at or near the same time, allowing them to interact with each other within the virtual-reality environment as though they were part of the 3-D virtual scene.

Live acting against only a green or blue screen can result in often lifeless performances. Such many be the result because actors do not have cues or emotional interaction with the elements of a 3-D virtual scene that will appear in the final version of a piece of content. Consider the example of a CGI character talking to a live actor as the CGI character walks around the live actor. In order to give a life-like performance, the live actor must focus their eyes on the true location of the CGI character as it moves relative to the live actor. However, it is very difficult for an actor to focus their eyes on something that isn't physically there. Instead, actors often exhibit a distant look in their eyes as they stare at a uniform green/blue background. Actors also have a difficult time judging the correct location of a CGI character or object, which makes it exceedingly difficult to properly track the movement of the CGI character or object with their eyes. Additionally, the lighting characteristics of a physical set may differ from the lighting characteristics of a 3-D virtual scene. This difference in illumination can often make an actor appear superimposed within a scene rather than being a natural part of the scene.

The embodiments described herein not only elicit a more emotional and life-like response from an actor, but these embodiments also allow actors to see and interact with real-time graphics (e.g., graphics displayed at an interactive frame-rate) and be illuminated correctly to match the illumination of the post-production render. These embodiments allow for a minimized matte-edge detail so that only a region directly behind the actor is illuminated with a chroma-key color for real-time and/or extraction and compositing. Illuminating the acting space with controlled lighting, LEDs, projectors, and/or any other light sources programmed with computer imagery can provide an immersive experience. By tracking the position of the actor and the position the camera and mapping these positions to the 3-D virtual scene, the proper inferred perspective of the actor can be used to generate projected images that provide proper graphic illumination. In short, the actor is able to realistically interact other characters and objects in the 3-D virtual scene, and the projected environment provides illumination characteristics that are consistent with the 3-D virtual scene.

As used herein, the term "virtual-reality environment" may be used interchangeably with the term "immersive photography environment." These terms should be interpreted broadly to include any real-world environment in which a subject can see and/or interact with elements of a 3-D virtual scene. This can include an area with display panels that partially surround the subject, an area that includes mechanical devices that are programmed to imitate elements of a 3-D virtual scene, or even an area where a subject can wear virtual-reality eyewear.

As used herein, the term "3-D virtual scene" describes any 3-D virtual environment that is represented within a computer system. Generally, a 3-D virtual scene may include animated objects, such as CGI characters constructed and/or animated using rigs and meshes, along with other scene elements such as rocks, cars, lighting, landscapes, textures, and/or the like.

As used herein, the term "subject" can refer to a live actor in a real-world environment. This term can also refer to other real-world objects that may be recorded by a camera and used to influence elements of a 3-D virtual scene. For example, a subject may refer to a human actor, and animatronic robot, a car, and animal, and/or the like.

As used herein, the term "chroma-key background" can refer to the any background used for compositing two images or video streams together based on color hue differences. For example, a green screen or blue screen may be commonly used as a chroma-key background.

Figure 1A:
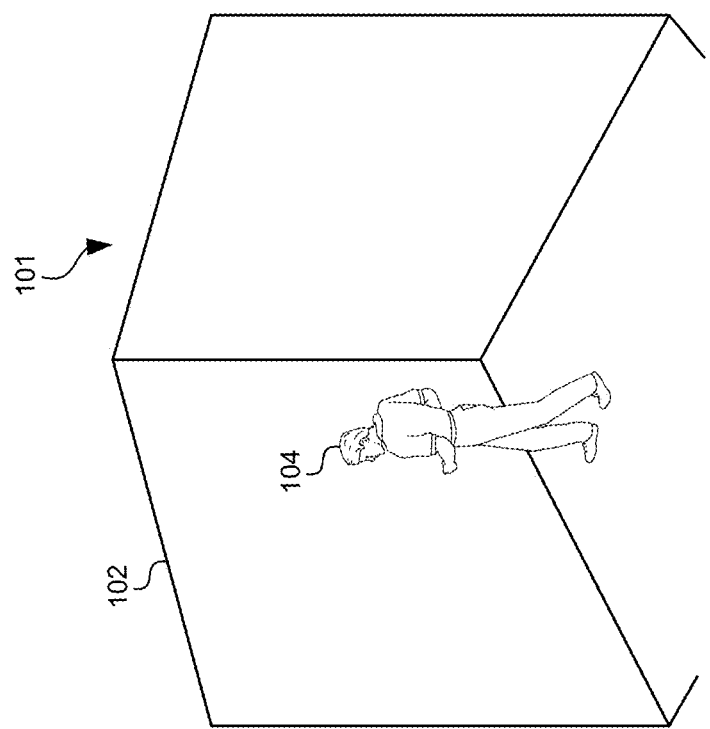
FIG. 1A illustrates a subject in a virtual-reality environment, according to some embodiments.

FIG. 1A illustrates a subject in a virtual-reality environment, according to some embodiments. The virtual-reality environment 101 may be comprised of a real-world space that provides some form of interaction with a 3-D virtual scene displayed by the virtual-reality environment 101. In this embodiment, the virtual-reality environment 101 is comprised of one or more display devices 102. These display devices 102 may include screens onto which images of elements of the 3-D virtual scene may be projected. These display devices 102 may also include active displays, such as LED panels, LCD panels, or other active display technologies. In some embodiments (not shown) the virtual-reality environment 101 may additionally or alternatively include physical devices that are used to present or suggest elements of the 3-D virtual scene. For example, robotic elements may be included that are controlled by actions or motions defined in the 3-D virtual scene. In another example, lasers can project intersecting light beams that creates images or holograms within the virtual-reality environment 101 to suggest locations or movements of elements of the 3-D virtual scene.

The virtual-reality environment 101 can in some cases present a panoramic view of the 3-D virtual scene. For example, the one or more display devices 102 may include vertical screens that surround the subject 104 to varying degrees. Vertical screens may be curved. Some embodiments may use a single screen in front of the subject 104, while some embodiments may use multiple screens that more fully surround the subject 104. Some embodiments may also extend the display onto the floor and/or ceiling of the virtual-reality environment 101. Some embodiments may mix the display devices 102 with other objects and/or lighting effects that are separate from the display devices 102.

FIG. 1B illustrates a subject inserted into a 3-D virtual scene, according to some embodiments. In contrast to the virtual-reality environment 101 of FIG. 1A, the 3-D virtual scene 106 of FIG. 1B may be stored and represented in a computer system. Generally, objects 112 in the 3-D virtual scene 106 may be constructed using meshes, rigs, and/or other virtual representations. The 3-D virtual scene 106 may include textures, landscapes, lighting effects, and/or the like. The 3-D virtual scene 106 may receive images or motion control information associated with the subject 104 to either place the subject in the 3-D virtual scene 106 or use the motion of the subject 104 in the virtual-reality environment 101 to influence the motion of a virtual character in the 3-D virtual scene 106.

The 3-D virtual scene 106 can be rendered to generate display images that correspond to the perspective of the subject 104 in the virtual-reality environment 101. Various methods can be used to track the location of the subject 104 within the real-world coordinates of the virtual-reality environment 101. These real-world coordinates can then be translated into a position in the 3-D virtual scene 106. A virtual camera 108 can be positioned at the location of the subject 104, and in some cases, the virtual camera 108 can be oriented in a direction 110 of the sight line of the subject 104.

Methods for tracking the location of the subject may include using a GPS device, using RFID tags and radio transmitters/receivers, using depth sensors, and/or the like. Some embodiments may use one or more cameras aimed at the subject 104 and calculate the location based on intersecting camera views. Some embodiments may track a center-of-mass of the subject 104, while some embodiments may track the location of the head of the subject 104. In motion capture situations, the subject 104 can wear a tracking helmet that records the location of the subject 104 and/or the orientation of the head of the subject 104.

Figure 2:
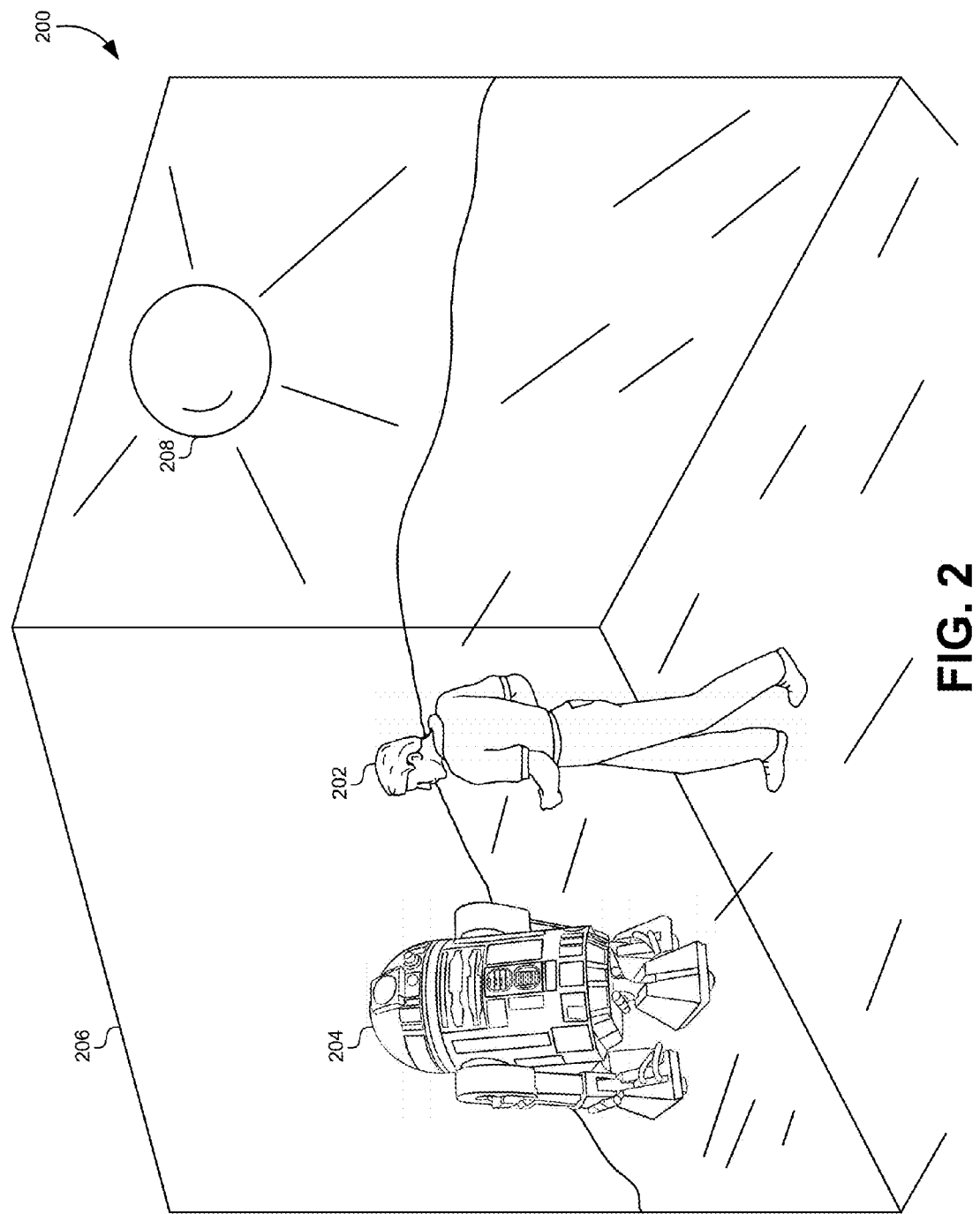
FIG. 2 illustrates a subject in a virtual-reality environment with elements of a 3-D virtual scene projected onto one or more display devices, according to some embodiments.

FIG. 2 illustrates a subject in a virtual-reality environment with elements of a 3-D virtual scene projected onto one or more display devices, according to some embodiments. In this embodiment, the virtual-reality environment 200 is provided with scenes from the 3-D virtual scene rendered from the perspective of the subject 202. In some embodiments, the assets (e.g., landscapes, characters, objects) of the 3-D virtual scene may be less detailed or of a lower resolution than the final rendering of the 3-D virtual scene included in the content to be presented to viewers (e.g., a movie audience). Referring again to FIG. 2, the display devices 206 of the virtual-reality environment 200 include a landscape and objects 204 with which the subject 202 may interact. Light sources 208 from the 3-D virtual scene may also be displayed by the display devices 206 in order to properly illuminate the subject 202 in a manner that is consistent with the lighting of the 3-D virtual scene.

As the subject 202 moves within the virtual-reality environment 200, the display devices 206 can display updated images rendered in real-time from the 3-D virtual scene. As described above, tracking technologies can constantly monitor the position of the subject 202 within the virtual-reality environment 200. This location can be provided in real-time to a rendering engine in a computer system to update the position of the virtual camera in the 3-D virtual scene. The computer system can perform a real-time render on the virtual 3-D scene from the updated camera position and provide a streaming video sequence of images to be displayed on the display devices 206.

By allowing the subject 202 to move within the virtual-reality environment 200, and by allowing objects 204 in the 3-D virtual scene to move, talk, and/or otherwise interact with the subject 202, the subject 202 can be provided with a more realistic environment to deliver their performance. For example, the object 204 can move from left to right, and the subject 202 would be able to visually track the object 204 throughout its range of motion and/or correctly focus his/her eyes on the objects 204. Additionally, as the subject 202 turns towards the light source 208, the illumination on the subject 202 will be consistent with the lighting that would be required when the subject 202 is inserted into the 3-D virtual scene. Generally, the display devices 206 may be said to display a visual representation of the 3-D virtual scene. This visual representation may include still images, as well as video sequences.

In some embodiments, the virtual-reality environment 200 of FIG. 2 need not be limited to capturing the performance of a subject. The real-time rendering and interaction with the objects 204 and light sources 208 can provide a realistic environment for video gaming, training environments, videoconferences, modeling and prototyping, entertainment, and/or the like.

Figure 3:
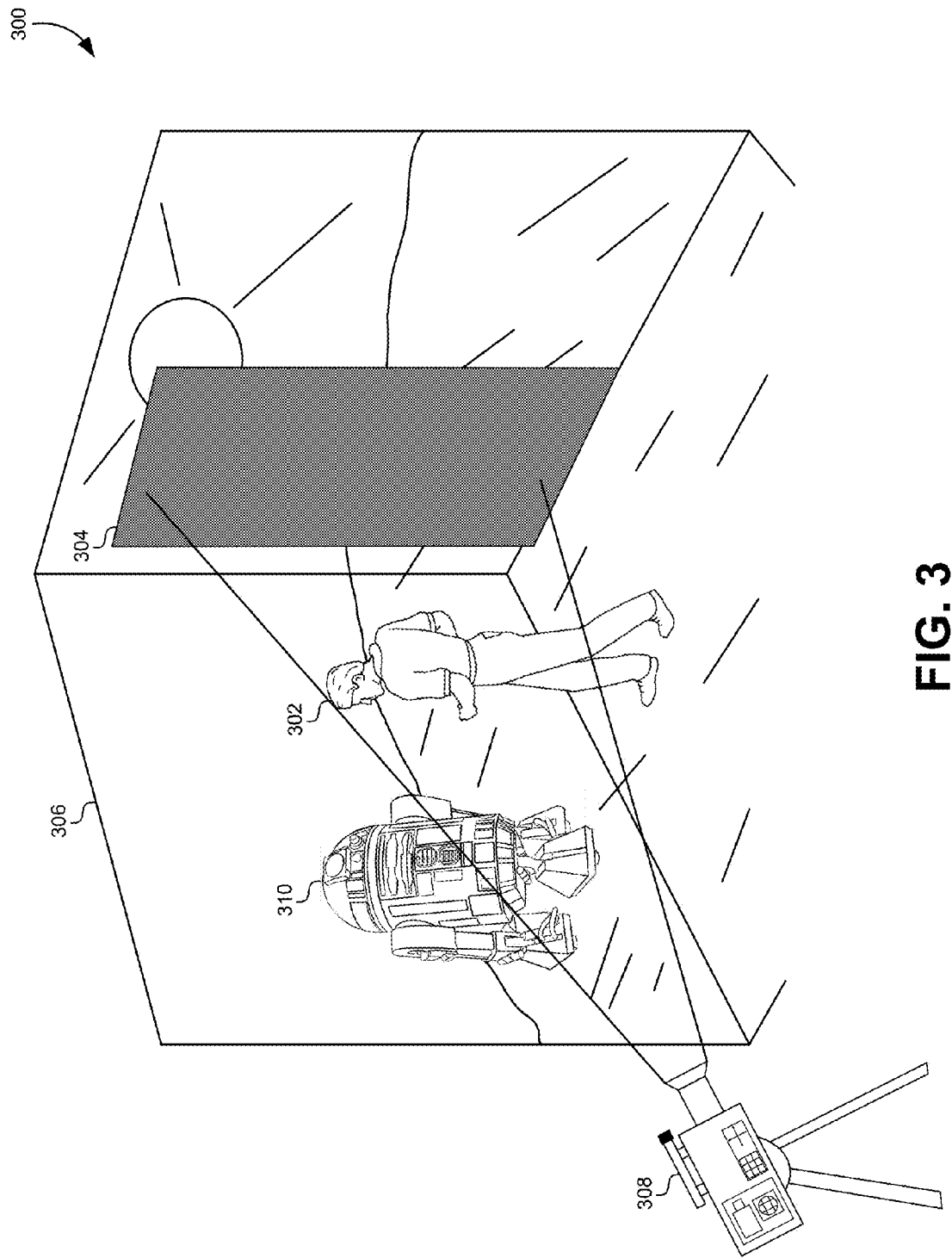
FIG. 3 illustrates a dynamic chroma-key background displayed in the virtual-reality environment, according to some embodiments.

FIG. 3 illustrates a dynamic chroma-key background displayed in the virtual-reality environment, according to some embodiments. In order to properly record a subject 302 within a virtual-reality environment 300, a camera 308 can be used to capture a video sequence of the subject 302. In some embodiments, the camera 308 can also be part of the tracking system used to track the location of the subject 302. Prior to this disclosure, capturing the performance of the subject 302 to be later inserted into a 3-D virtual scene required the subject 302 to perform in front of a chroma-key background, such as a green screen or blue screen. The color contrast between the subject 302 and the chroma-key background allows the computer system to extract the subject 302 from the real-world environment and insert the subject 302 into the 3-D virtual scene in a realistic manner. However, providing an immersive photographic experience in a virtual-reality environment substitutes the traditional green/blue screens with real-time displays of the 3-D virtual scene. In this situation, the camera 308 may capture images of the subject 302 against the scenes displayed by the display devices 306, making it difficult to separate the subject 302 from the rendered background images.

To solve this and other problems, some embodiments may provide a dynamic chroma-key background 304 to be displayed with the visual representations of the 3-D virtual scene in such a way that the actor can still interact with the visual representations of the 3-D virtual scene while the camera can capture images of the actor against the chroma-key background. The chroma-key background 304 can be displayed as a traditional blue screen, green screen, and/or any other contrasting color suitable for generating a matte image. The chroma-key background can be overlain on top of selected portions of the 3-D virtual scene. The chroma-key background can be sized such that it is approximately the same size as a projection of the actor on the display devices 306 from the view of the camera 308. In other embodiments, the chroma-key background can be interleaved between projected frames of the 3-D virtual scene as they are projected on the display devices 306.

Different embodiments may display the chroma-key background 304 with the visual representations of the 3-D virtual scene in different ways. In the embodiments of FIG. 3, the chroma-key background 304 is integrated into at least a portion of the visual representation of the 3-D virtual scene. As the images that make up the visual representation of the 3-D virtual scene are displayed on the display devices 306, the computer system can insert the chroma-key background 304 into the images as they are displayed.

The size, shape, and/or location of the chroma-key background 304 can be changed by the computer system based on the location of the camera 308 and the location of the subject 302. If the location of the camera 308 and the location of the subject 302 are known, then the computer system can calculate a projection of the subject 302 onto the display device 306. The computer system can then use the projection of the subject 302 to generate an appropriately sized chroma-key background 304. Some embodiments may simply generate a rectangle that is at least the height and width of the projection of the subject 302. Some embodiments may instead generate a chroma-key background 304 that is shaped approximately like the projection of the subject 302. Although not shown explicitly, the chroma-key background 304 in these embodiments would be shaped slightly larger than the projection of the subject 302 against the display device 306. In some embodiments, the shape of the chrome-key background may be based on the virtual scene being displayed. For example, the computer system may determine that a scene includes a virtual character may be in close proximity to an actor. As a result, the shape of the chroma-key background may have a shape substantially similar to that of the actor. As such, the actor would be able to see virtual character on the display 306.

The chroma-key background 304 may be dynamically shaped in real-time to follow the motion of the subject 302. For example, as the subject 302 raises his/her arm, the chroma-key background 304 could change shape to conform to the projection of the subject 302 against the display device 306. Known technology such as the Kinect® sensor can use projected infrared energy and 3-D image reconstruction to track the motions of the subject 302, which can then in turn be used to generate the shape of the chroma-key background 304. For example, the location of the subject 302 can be tracked placing small fiducial markers on the subject 302. The fiducial markers can be recognized visually and tracked by a camera system comprising a plurality of cameras surrounding the actor. The fiducial markers may comprise traditional small, white motion capture spheres or small graphical elements placed on the subject 302. In other embodiments, the location of the subject 302 can be tracked using depth sensors, passive infrared motion detectors, or radio-frequency tags that triangulate the position of the subject 302. In cases where projected infrared energy is used, a volumetric representation of the subject 302 can be generated and sent to the computer that is rendering the 3-D virtual scene. In cases where only the location of the subject is known, a representative block or shape can be used to represent the volume of the subject 302, such as a large rectangle or a human-shaped cutout. The volumetric representation of the actor can then be colored in the chroma-key color (e.g. blue, green) and inserted into the 3-D virtual scene by the computer system and rendered as part of the image to generate the two-dimensional chroma-key background projected onto the screen in real time (or at interactive frame rates). The computer system can also resize the volumetric representation and/or 2-D projection such that the projected image is slightly larger than the subject 302. This can ensure that the chroma-key background is visible around the subject 302 as the performance is captured by the physical camera. In some embodiments, motion of the subject 302 can also be determined based on motion vectors calculated between successive frames. The motion of the actor can then be used to predict the location of the subject 302 in successive frames, such that the computer system can predict where to place the chroma-key background in the projection of the virtual 3-D image to keep up with the movements of the subject 302.

By minimizing the size of the chroma-key background 304 to approximately match the size of the projection of the subject 302, the surface area of the display device 306 dedicated to the chroma-key background 304 can be minimized. This allows more of the surface area of the display device 306 to present the visual representation of the 3-D virtual scene. If the chroma-key background is too large, it may provide a visual discontinuity in the scene that is very noticeable to the subject 302. If an entire screen of the display device 306 is simply colored green, it will interfere with the realistic representation of the 3-D virtual scene that is essential to helping the subject 302 perform realistically. For example, the subject 302 may be interacting with a CGI robot character. If the chroma-key background covers the CGI robot character or other essential scene elements, the performance of the subject 302 may be disrupted or appear unrealistic.

Occasionally, as the camera 308, the subject 302, and/or an object 310 in the 3-D virtual scene move relative to each other, the chroma-key background 304 may tend to interfere with the interaction between the subject 302 and the object 310 in the virtual 3-D scene. However, by minimizing the size of the chroma-key background 304 and moving it relative to the position of the cameras 308 and/or subject 302, the interference with the interaction between the subject 302 and the object 310 can be minimized. As described above, the computer system can determine how to move and resize the chroma-key background based on the location of the subject 302. In some cases, the volumetric representation of subject 302 (e.g., an actor) can simply be inserted into the virtual 3-D scene in the computer system and rendered in the chroma-key color as part of the scene projected onto the display device 306. As the subject 302 moves, the computer system determines, at interactive rates, which portions of an environment of the virtual 3-D scene are to be replaced by the chroma-key background 304 and which portions are to be revealed from previous replacement at any given moment in time. In other cases, the chroma-key background can be inserted after the entirety of the 3-D scene is rendered onto the 2-D image that is projected on the display device 306 as a 2-D silhouette. In either case, the size of the subject may be recorded a priori or measured as images of the subject 302 are captured. The size of the chroma-key background can be increased or decreased in real-time based on the size of the subject 302, the location of the physical camera, and the location of the subject 302 relative to the display device 306. By making the chroma-key background conform as closely to the shape of the projection of the subject 302 on the display device 306 as possible, the amount of the visual representation of the virtual 3-D scene that is obscured by the chroma-key background can be minimized. In some embodiments, certain scene elements, such as characters or objects with which the subject 302 may interact, may be specially designated in the 3-D virtual scene. When generating the chroma-key background, the computer can ensure that no portion of these designated elements are covered by the chroma-key background. While this may make extracting the images of the subject 302 from the projected scene more difficult (because the chroma-key background is not behind the subject 302), it may also prevent the chroma-key background from interfering between the subject 302 and CGI characters in the scene.

Figure 4:
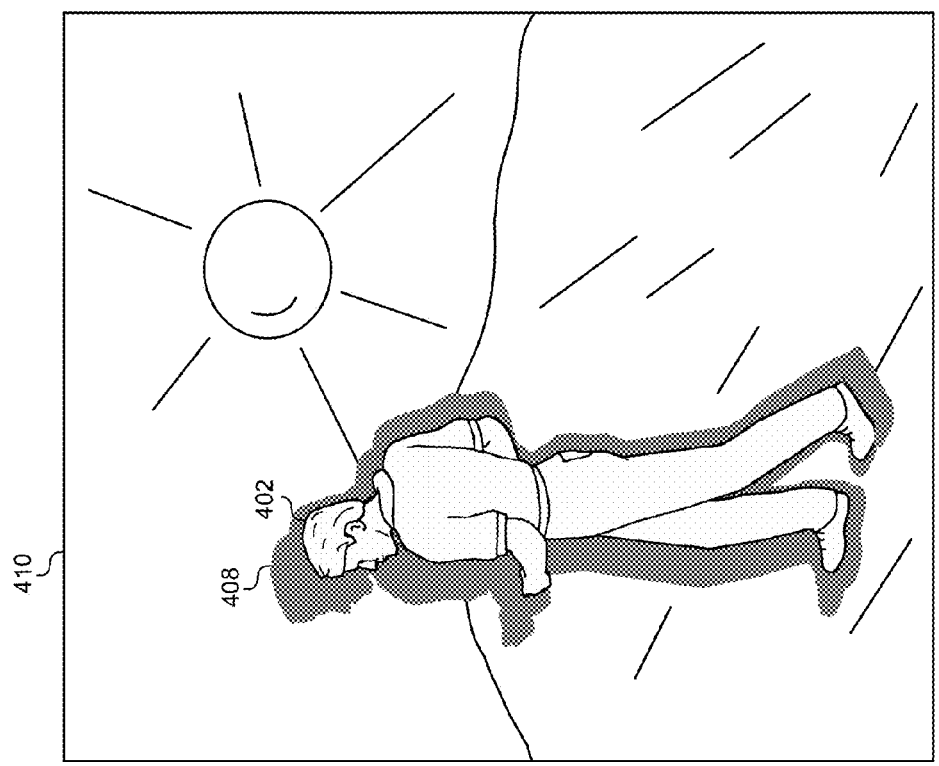
FIG. 4 illustrates a 2-D camera perspective of an image of the subject in the virtual-reality environment captured against the chroma-key background, according to some embodiments.
Figure 4:
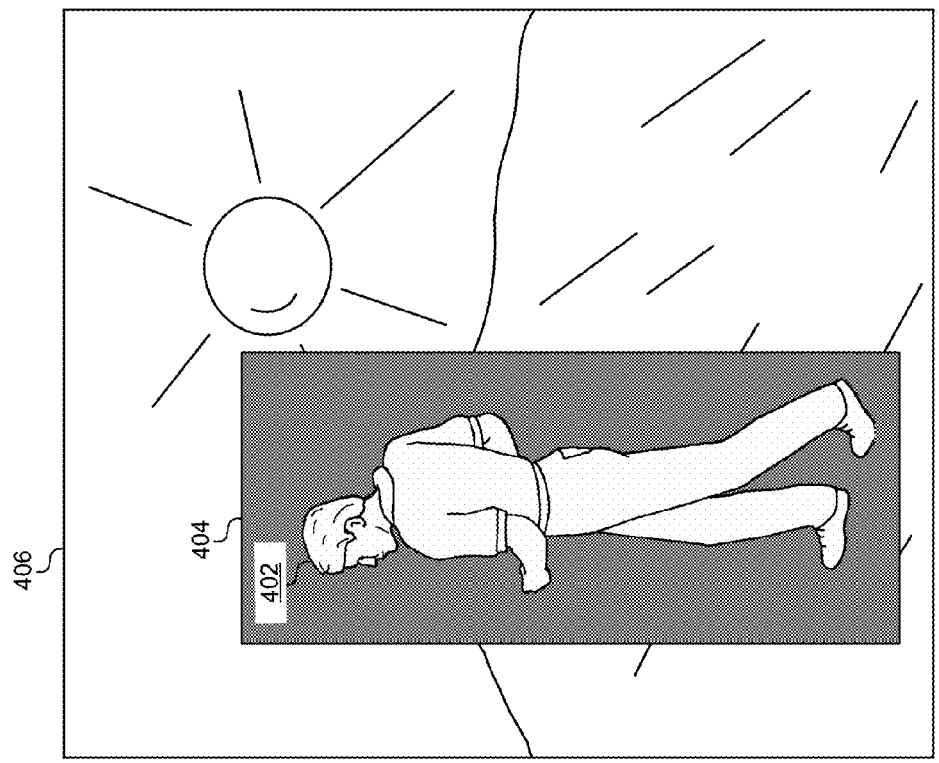

FIG. 4 illustrates a 2-D camera perspective of an image of the subject in the virtual-reality environment captured against the chroma-key background, according to some embodiments. In the first image 406, the subject 402 is captured against the landscape of the 3-D virtual scene using a rectangular chroma-key background 404. In the second image 410, the subject 402 is captured against the landscape of the 3-D virtual scene using a chroma-key background 408 that has a similar, but slightly larger shape with respect to the subject 402.

It will be understood that these two examples of dynamic chroma-key backgrounds are merely exemplary and not meant to be limiting. Other shapes could also be used. For example, if multiple panels were used as display devices, an entire panel could be displayed as a chroma-key background. The panel to be used as the chroma-key background can be selected based on the relative location of the subject and the camera. In other embodiments, the chroma-key background could be shaped as a circle, oval, parallelogram, trapezoid, or any other shape that would facilitate generating a matte image.

Figure 5:
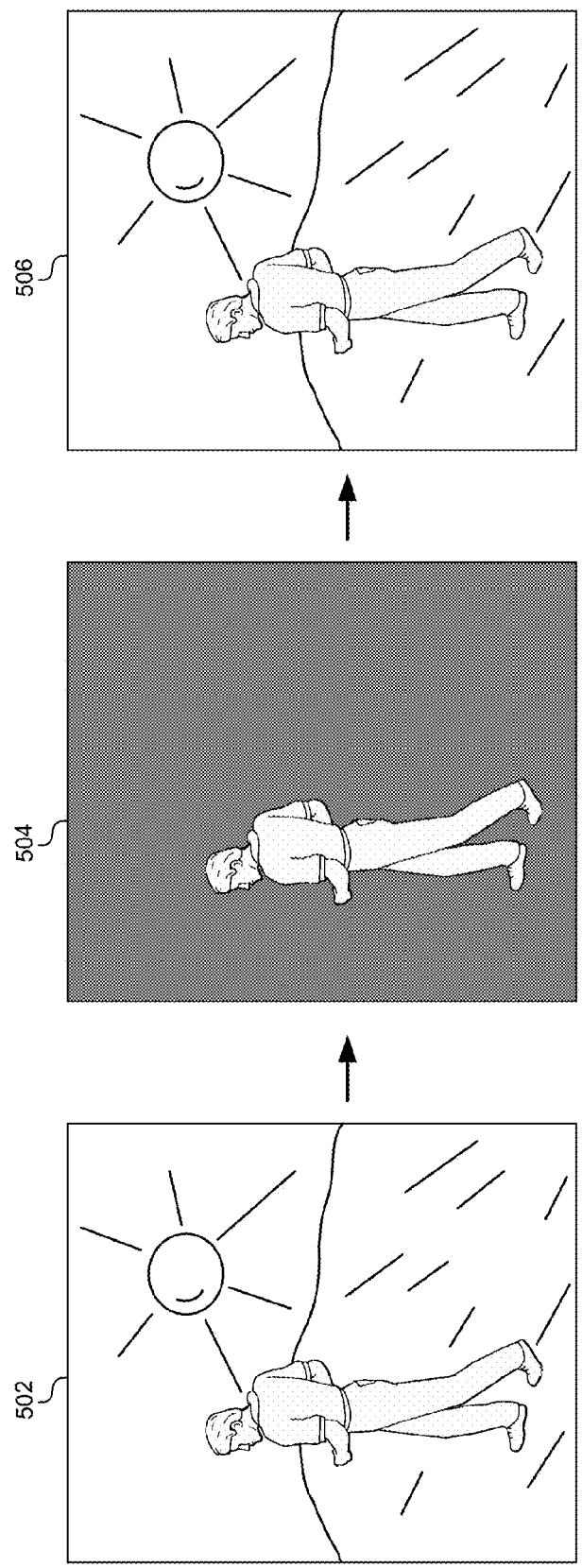
FIG. 5 illustrates chroma-key background image sequences that are synced to the camera frame rate, according to some embodiments.

FIG. 5 illustrates chroma-key background image sequences that are synced to the camera frame rate, according to some embodiments. In contrast to the embodiments of FIG. 4 described above that display a chroma-key background as part of the visual representation of the 3-D virtual scene, the embodiments of FIG. 5 synchronize frames displayed on the display devices with the frame rate of the camera. Instead of displaying the chroma-key background in at least a portion of each frame displayed on the display devices, the chroma-key background can instead be interleaved periodically within the display frames. FIG. 5 illustrates a sequence of image frames captured by the camera. Frame 502 shows the subject against the visual representation of the 3-D virtual scene. The next frame 504 shows the subject against the chroma-key background. The third frame 506 shows the subject again against the visual representation of the 3-D virtual scene.

The time during which the chroma-key background is displayed relative to the time in which the visual representation of the 3-D virtual scene is displayed can be minimized to avoid a flicker effect for the subject. The image capture rate of the camera can be synchronized with the rate at which the display of the chroma-key background is displayed by the display devices. Thus, the camera can be configured to capture images primarily when the chroma-key background is displayed rather than when the visual representation of the 3-D virtual scene is displayed on the display devices. For example, for a camera with frame rate of 240 Hz, the chroma-key background could be displayed at a frame rate of 120 Hz, 60 Hz, 30 Hz, etc., such that only 1 out of every 2, 1 out of every 4, 1 out of every 8, etc., frames captured by the camera would show the subject against the chroma-key background.

In this embodiment, the entire display device switches between the visual representation of the 3-D virtual scene and the chroma-key background. In other embodiments, only a portion of the display device switches to the chroma-key background. The portion of the display device can be shaped according to any of the methods described above.

Figure 6B:
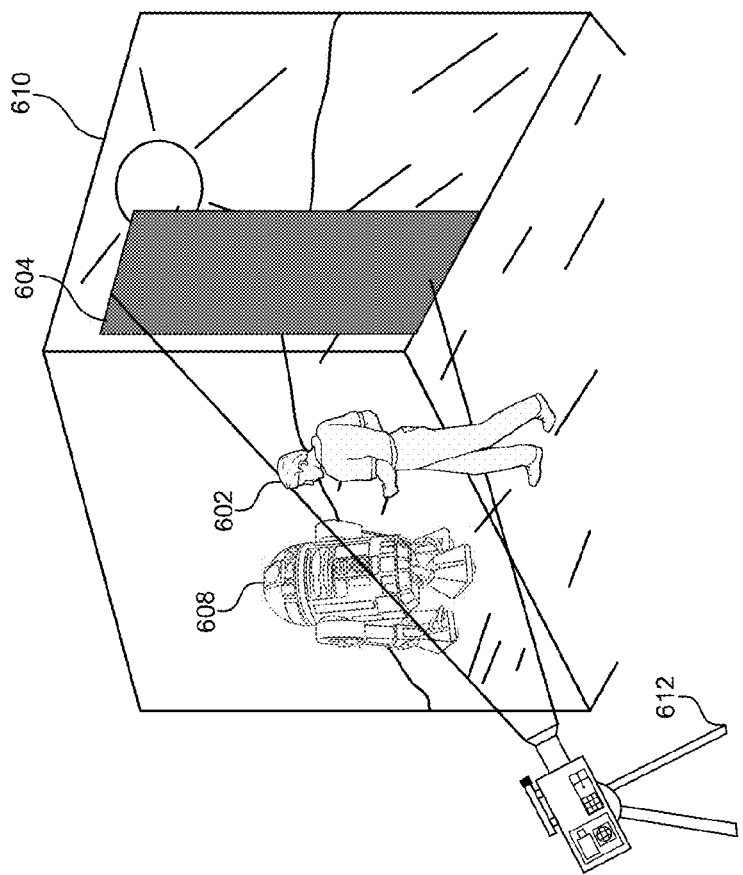
FIG. 6B illustrates a chroma-key background with the subject at a second position, according to some embodiments.
Figure 6A:
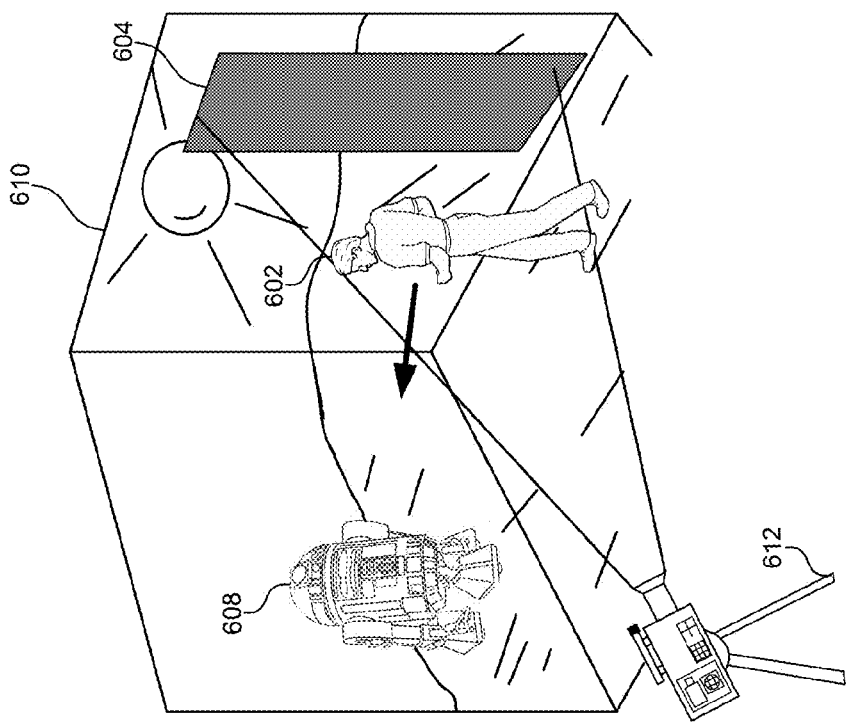
FIG. 6A illustrates a chroma-key background with a subject at a first position, according to some embodiments.

FIG. 6A illustrates a chroma-key background with a subject at a first position, according to some embodiments. In this scene, the subject 602 may interact with an object 608 of a 3-D virtual scene by walking towards the object 608. The chroma-key background 604 is displayed by the display device 610 according to the projection of the subject 602 on the display device 610. The projection of the subject 602 on the display device 610 can be thought of as the shadow of the subject 602 on the display device 610 from the perspective of the camera. As the subject 602 moves closer to the camera, the projection will get larger. Similarly as the subject 602 moves away from the camera and towards the display device 610, the projection will get smaller until it approaches the actual size of the subject 602. Note that the chroma-key background 604 can be relatively small because the subject 602 is relatively close to the display device 610.

FIG. 6B illustrates a chroma-key background with the subject at a second position, according to some embodiments. As the subject 602 is moved closer to the object 608 and farther away from the display device 610, the location of the chroma-key background 604 changes to stay behind the subject 602 in the view of the camera 612. Also note that the chroma-key background 604 grows larger as the subject 602 moves closer to the camera 612 because the projection of the subject 602 on the display device 610 will be larger. Note that the same type of movement and resizing of the chroma-key background 604 can also accompany movement of the camera 612 relative to the subject 602. As described above, the location of the subject 602 can be tracked using a variety of different sensor types, the size of the subject can either be measured a priori and entered into the computer system or the size of the subject 602 can be measured in real time using depth sensors and/or projected infrared sensors, and the location of the display device 610 and the camera 612 can be mechanically tracked by the computer system. This information can be fed into the computer system generating the rendered images of the 3-D virtual scene in order to properly size the chroma-key background as the subject 602 and/or camera 612 move relative to the display device 610.

Figure 7:
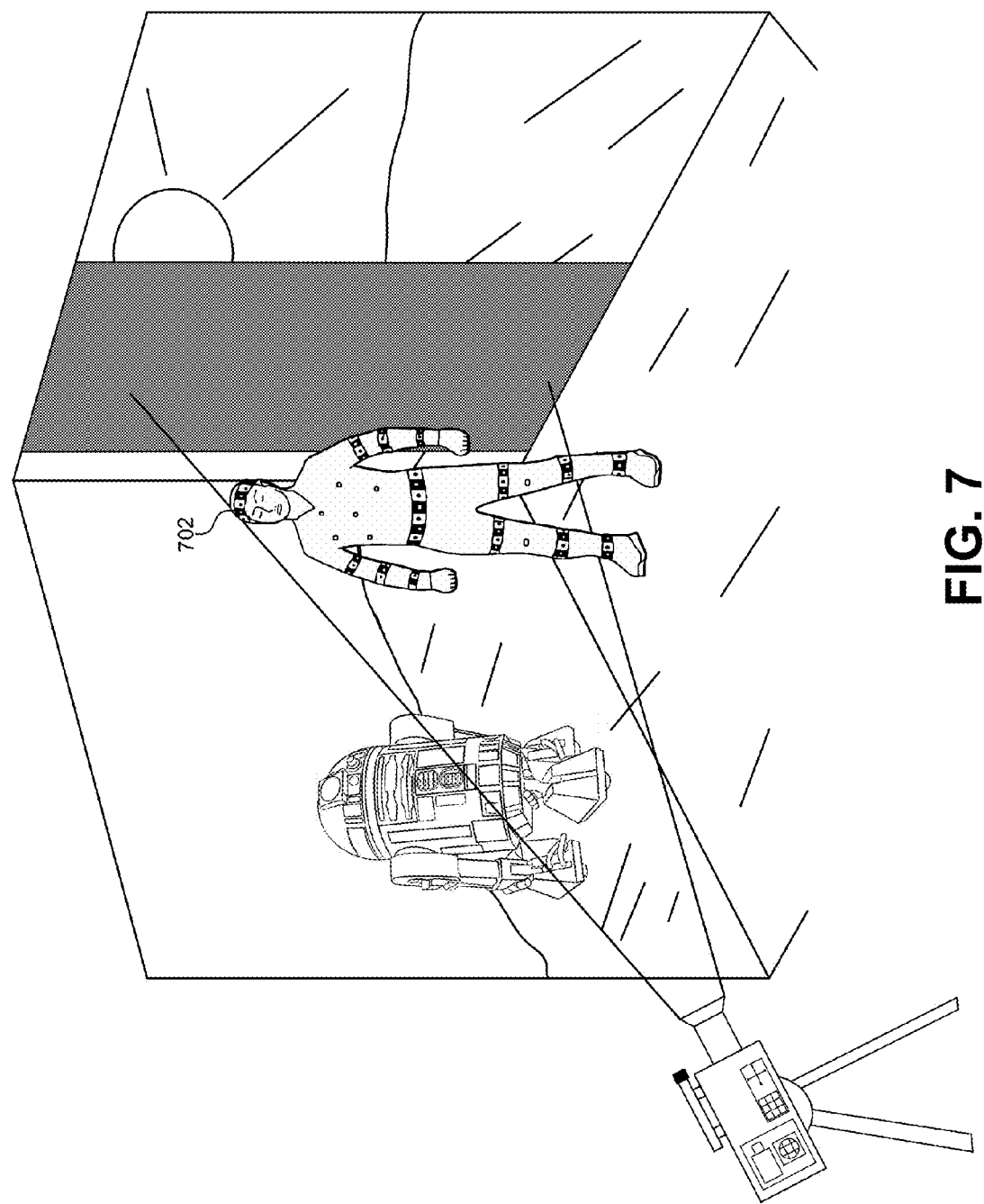
FIG. 7 illustrates a subject performing motion capture in a virtual-reality environment, according to some embodiments.

FIG. 7 illustrates a subject performing motion capture in a virtual-reality environment, according to some embodiments. This embodiment is similar to those embodiments discussed above, except that motion capture is performed on the subject 702 rather than capturing the texture and lighting of the subject 702. During motion capture, the subject 702 may wear a motion capture suit that is equipped with visual markers that can be tracked by motion capture system. The movement of the subject 702 can be used to influence the motion of a CGI character in the 3-D virtual scene.

In this embodiment, the chroma-key background 704 can still be used with the subject 702 during motion capture. In other embodiments, the chroma-key background 704 can be eliminated so long as the images captured by camera 706 can be processed by the computer system to effectively distinguish the visual markers of the motion capture suit from the background of the 3-D virtual scene. Even though the need for an interactive environment to elicit a realistic response from the subject 702 in a motion capture scenario may be lessened, is still important for the subject 702 to properly interact with other elements of the 3-D virtual scene.

Figure 8:
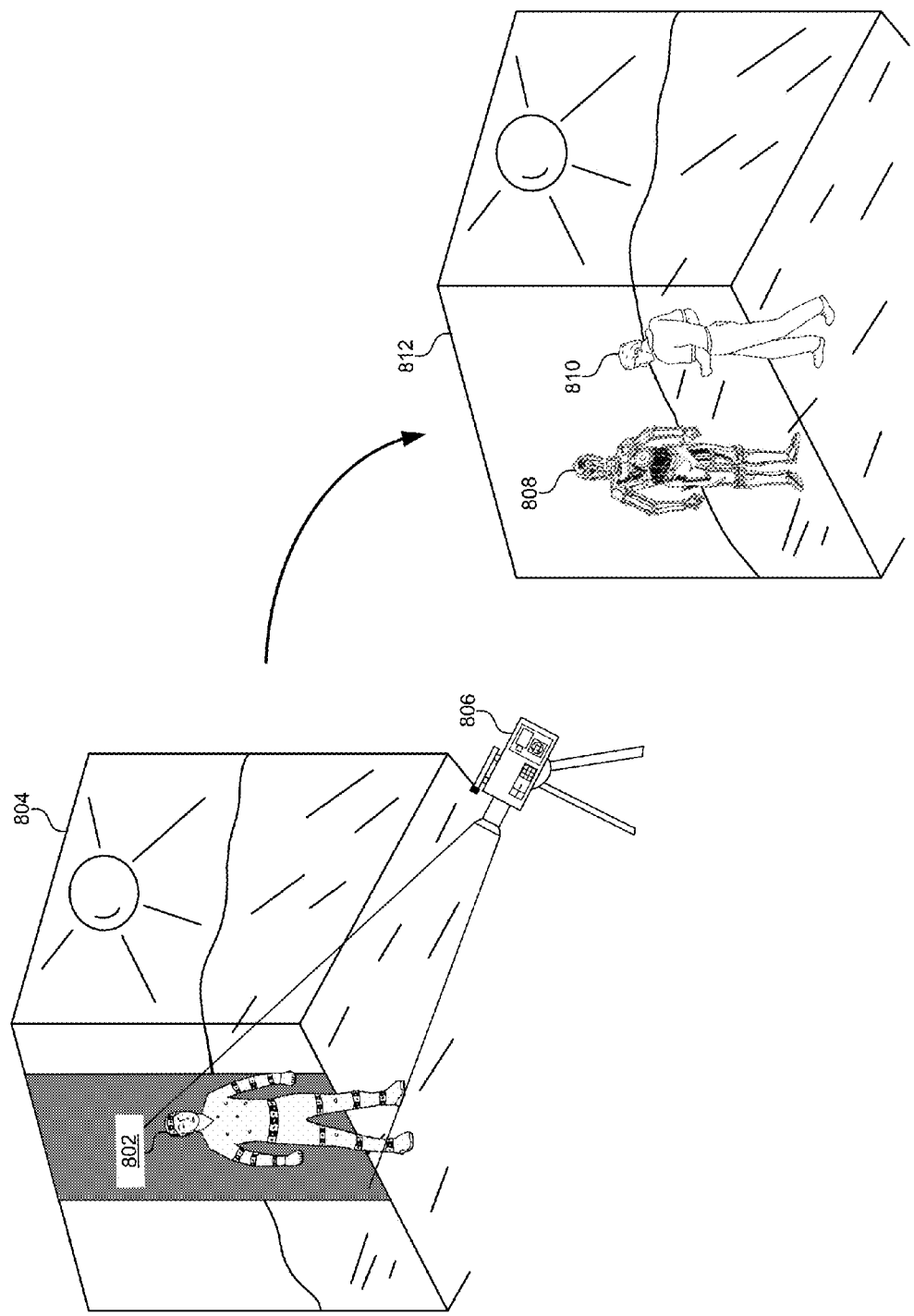
FIG. 8 illustrates multiple subjects interacting in real time in a collaborative virtual-reality environment, according to some embodiments.

FIG. 8 illustrates multiple subjects interacting in real time in a collaborative virtual-reality environment, according to some embodiments. Here, two separate virtual reality environments 804, 812 can be used, each for a different subject 802, 810. In other embodiments, a single virtual-reality environment can be used with one or more cameras trained on each of the subjects 802, 810. These embodiments allow for the subjects 802, 810 to interact with each other through the 3-D virtual scene.

For example, subject 802 can be captured by camera 806 in a motion capture scenario. The performance of subject 802 can be received by a computer system that uses the motion capture information to influence the movement of a virtual character 808. The 3-D virtual scene and the movement of the virtual character 808 can be rendered in real time and presented in the second virtual-reality environment 812. The virtual character 808 based on subject 802 can interact with subject 810 in real time.

Although not shown explicitly, it will be understood that the reverse process may also take place simultaneously. Specifically, the performance of subject 810 can be captured by a camera in the virtual reality environment 812 and sent to the computer system where the performance is inserted into the 3-D virtual scene. A render of the 3-D virtual scene from the perspective of subject 802 can be performed, and the resulting rendered images can be transmitted to the virtual-reality environment 804 such that subject 802 can interact with subject 810 and vice versa.

In other embodiments, both subject 802 and subject 810 can be recorded and interact with each other as a combined performance in a single virtual-reality environment. Multiple dynamic chroma-key backgrounds can be accordingly inserted into the visual representation of the 3-D virtual scene as they correspond to the positions of various cameras and the subjects 802, 810.

Figure 9:
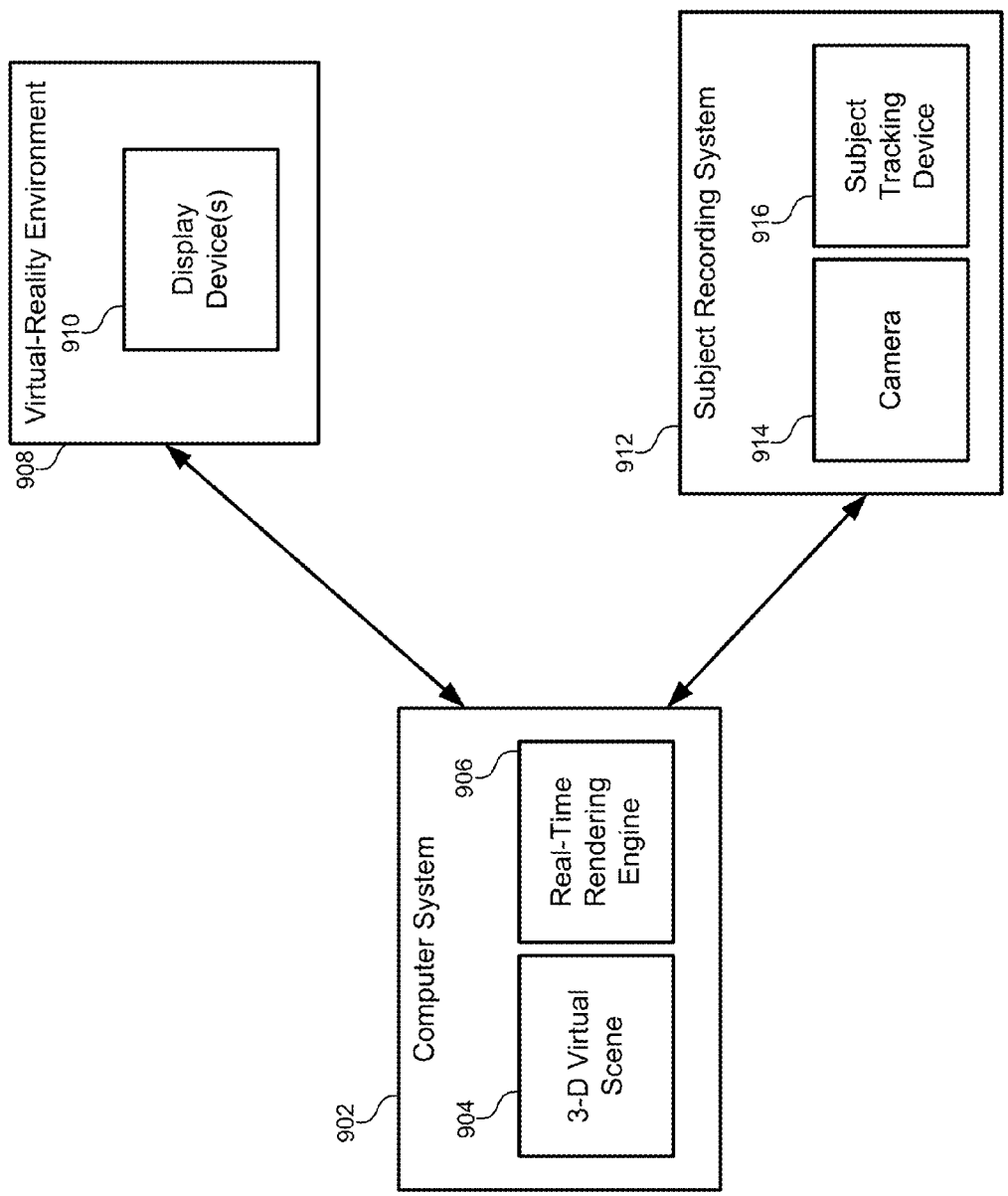
FIG. 9 illustrates a block diagram of an immersive photography system with dynamic chroma-key backgrounds, according to some embodiments.

FIG. 9 illustrates a block diagram of an immersive photography system with dynamic chroma-key backgrounds, according to some embodiments. The virtual-reality environment 908 may include one or more display devices 910. The display devices 910 may include rear projection screens, active display screens, physical objects, robotics, and/or the like. The virtual-reality environment 908 can receive images from the computer system 902 in real time to display the interactive environment described above for the subject. As used herein, the term "interactive" encompasses the concept that as the subject provides a performance in response to displayed images of the 3-D virtual scene, subsequently displayed images/sounds are changed based on the performance of the subject. For example, as the subject moves around relative to the display device, a CGI character in the displayed images can visually track or walk with the subject. In another example, as a subject talks to a displayed character, the displayed character can talk back. Certain lines of dialogue can trigger responsive dialogue in the CGI character. In other embodiments, the CGI character can be controlled by a human user, or may be based on motion-captured images of a second subject as described elsewhere herein.

A subject recording system 912 may comprise a camera 914 and a subject tracking device 916. The camera can be used to capture images and flash for video sequences of the subject in the virtual-reality environment 908. The camera 914 may also include position controls and sensors that detect and/or control the location, orientation, and focal characteristics of the camera 914. The subject tracking device 916 can be used to track the location of the subject and/or the orientation of the head of the subject (i.e., where the subject is looking) The subject tracking device 916 can include GPS, radar, depth sensors, infrared emissions and detections, visual tracking systems, RFIDs, and/or the like.

The computer system 902 may include a definition of a 3-D virtual scene 904. The 3-D virtual scene 904 may be comprised of multiple characters, backgrounds, textures, lighting effects, animations, and/or the like. The real-time rendering engine 906 can receive information from the subject recording system 912 including the location/orientation of the subject and the location/orientation of the camera 914. The real-time rendering engine 906 can place the virtual camera at the location of the subject with the same orientation and generate a real-time render of the 3-D virtual scene 900. This real-time stream of images may be displayed on the display devices 910 of the virtual-reality environment 908. Based on the location of the subject and the location/orientation of the camera, the real-time rendering engine 906 can insert a dynamic chroma-key background in the visual representation of the 3-D virtual scene for display on the display devices 910.

The communications between the virtual-reality environment 908, the computer system 902, and the subject recording system 912 may be continuous and in real time. Information may stream between each of these subsystems in order to provide an immersive photographic experience within the virtual-reality environment for the subject.

Figure 10:
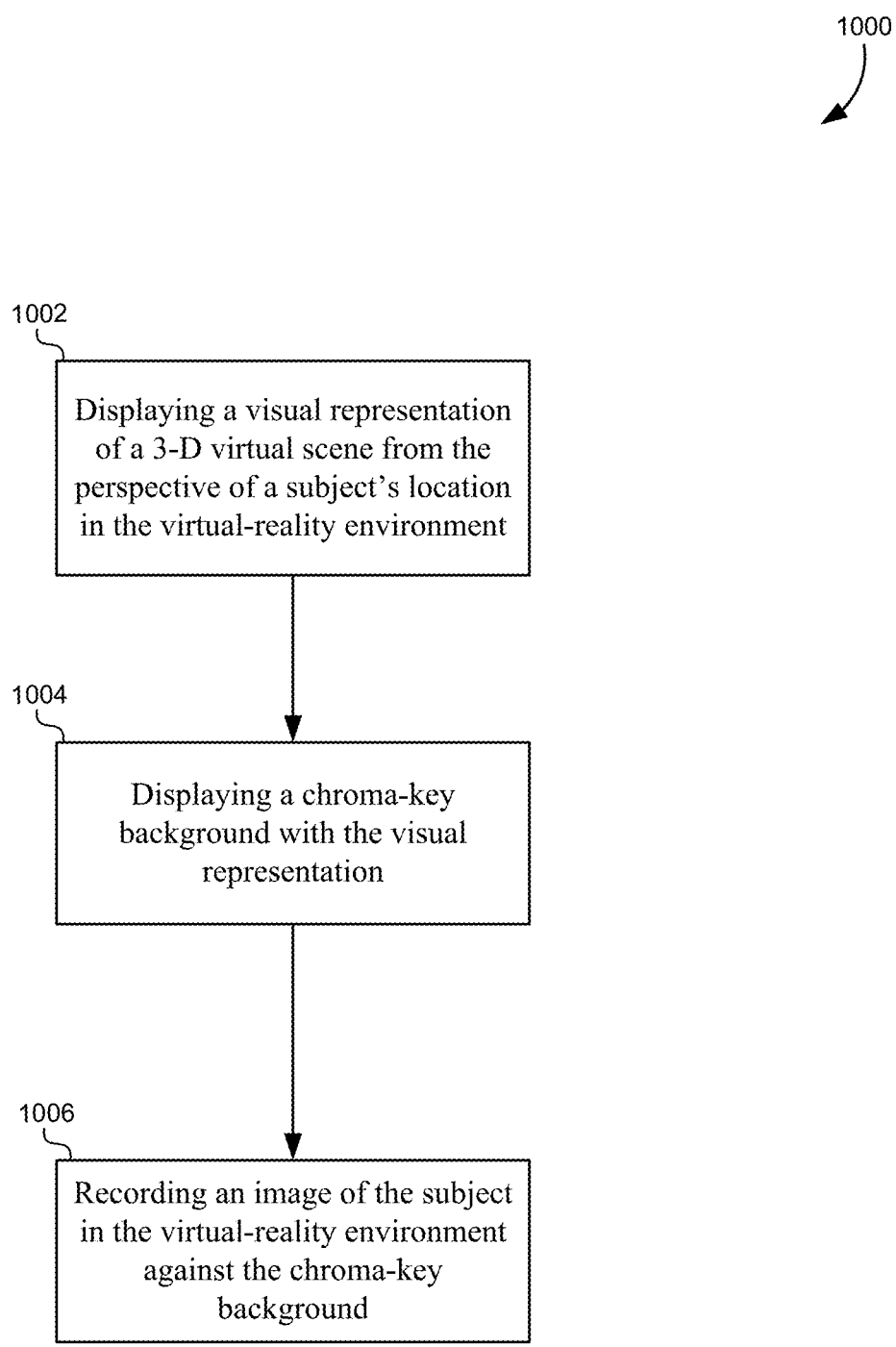
FIG. 10 illustrates a flowchart of a method for capturing one or more images of a subject within an immersive photography system using chroma-key backgrounds, according to some embodiments.

FIG. 10 illustrates a flowchart of a method for capturing one or more images of a subject within an immersive photography system using dynamic chroma-key backgrounds, according to some embodiments. The method may include displaying a visual representation of the 3-D virtual scene from the prospective of a subject location in a virtual reality environment (1002). As described above, the visual representation may be displayed on one or more display devices of the virtual-reality environment, and the visual representation may be generated by a computer system that receives location information for the subject and renders the visual representation from the perspective of the subject's location. This may include receiving tracking information of the location of the subject in the virtual-reality environment, determining a location in the 3-D virtual scene based on the location of the subject in the virtual-reality environment, and rendering the 3-D virtual scene from the perspective of the location in the 3-D virtual scene to generate the visual representation of the 3-D virtual scene.

The method may also include displaying a chroma-key background with the visual representation (1004). As described above, the chroma-key background can be displayed periodically to coincide with the frame capture rate of the camera. The chroma-key background can also be displayed such that it only occupies a portion of the visual representation that immediately surrounds the subject. The chroma-key background can be dynamically moved and/or resized based on the location of the subject and/or the location of the camera. Both the camera and the subject can move fluidly within the virtual-reality environment, and the chroma-key background can adjust in real-time accordingly.

The method may further include recording an image of the subject in the virtual-reality environment against the chroma-key background (1006). The recorded image of the subject may be part of a recorded video sequence. The video sequence can be part of a motion capture session in which the motion of the subject is used to influence the motion of a character in the virtual 3-D scene. Lighting effects can be presented in the virtual-reality environment to be consistent with those that are present in the 3-D virtual scene. The recorded image of the subject can be used to generate a visual representation of the subject in the virtual 3-D scene to be displayed to another subject in the same or a different virtual-reality environment.

After capturing the performance of the subject, the performance can be isolated from the projected elements of the virtual 3-D scene. In other words, a video of the subject's performance against the chroma-key background can be extracted, and the video can then be inserted into a render of the 3-D scene. While the real-time render (or interactive frame rate render) performed during the performance of the subject is used to project a lifelike environment, the performance of the subject can be inserted into the virtual 3-D scene and rendered again possibly using a higher-quality render) to generate the images for the digital media production, or the performance of the subject can be inserted into the 2-D render of the virtual 3-D scene. The recorded location of the subject during the performance relative to the camera and the display device can be used to determine the location in the virtual 3-D scene where image of the subject's performance should be inserted. For example, as the subject walks around the virtual-reality environment during the performance capture, the location of the subject will be tracked as described above. The images of the subject can then be isolated and inserted into pre- or post-rendered images of the 3-D virtual scene at locations based on the tracked locations.

It should be appreciated that the specific steps illustrated in FIG. 10 provide particular methods of capturing images of a subject according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
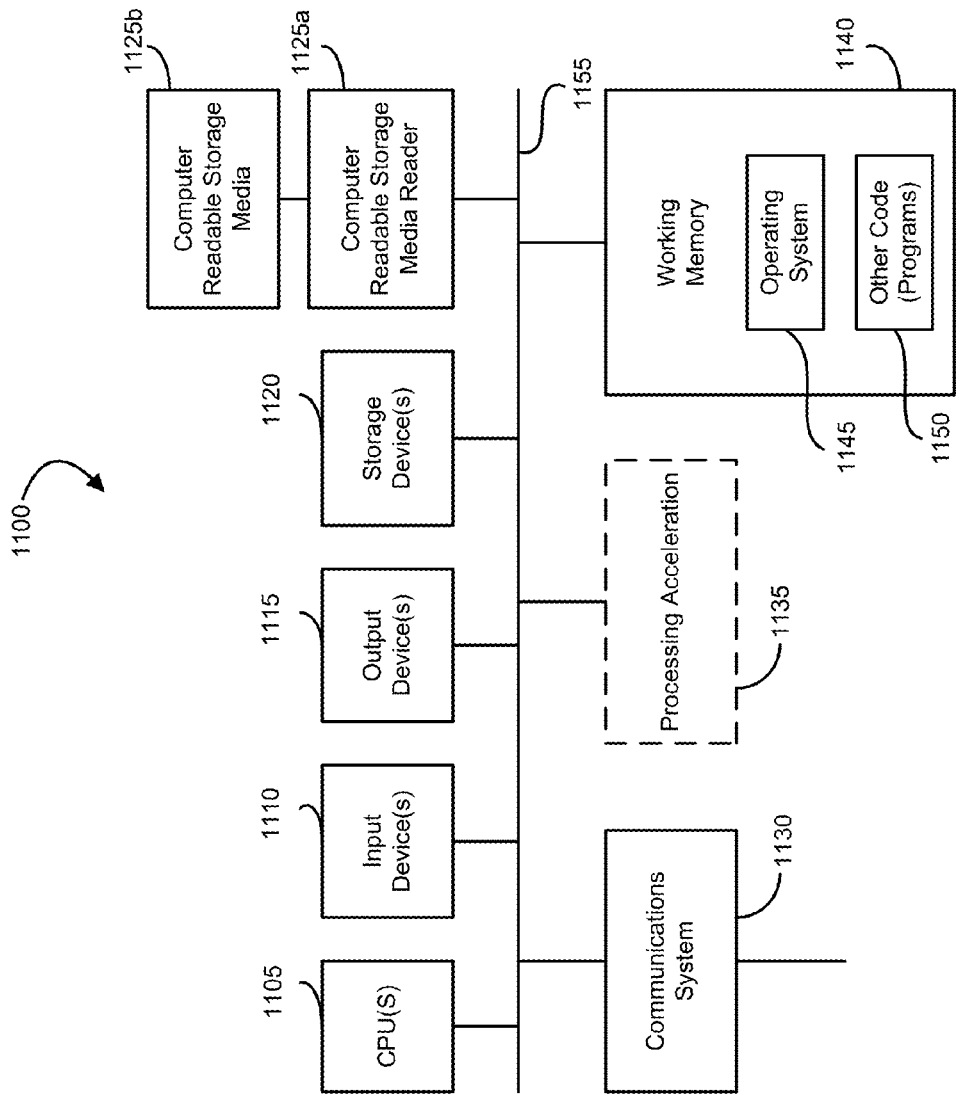
FIG. 11 illustrates a block diagram of an exemplary computer system in which embodiments of the present invention may be implemented.

Each of the embodiments disclosed herein may be implemented in a special-purpose computer system. FIG. 11 illustrates an exemplary computer system 1100, in which parts of various embodiments of the present invention may be implemented. The system 1100 may be used to implement any of the computer systems described above. The computer system 1100 is shown comprising hardware elements that may be electrically coupled via a bus 1155. The hardware elements may include one or more central processing units (CPUs) 1105, one or more input devices 1110 (e.g., a mouse, a keyboard, etc.), and one or more output devices 1115 (e.g., a display device, a printer, etc.). The computer system 1100 may also include one or more storage device 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125*a*, a communications system 1130 (e.g., a modem, a network card (wireless or wired), an infra-red communication device, etc.), and working memory 1140, which may include RAM and ROM devices as described above. In some embodiments, the computer system 1100 may also include a processing acceleration unit 1135, which can include a DSP, a special-purpose processor and/or the like.

The computer-readable storage media reader 1125*a* can further be connected to a computer-readable storage medium 1125*b*, together (and, optionally, in combination with storage device(s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100.

The computer system 1100 may also comprise software elements, shown as being currently located within a working memory 1140, including an operating system 1145 and/or other code 1150, such as an application program (which may be a client application, web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed. Software of computer system 1100 may include code 1150 for implementing embodiments of the present invention as described herein.

Each of the methods described herein may be implemented by a computer system, such as computer system 1100 in FIG. 11. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
generating, for display on one or more display devices in a virtual-reality environment, an image comprising a visual representation of a 3-D virtual scene rendered from the perspective of a subject located in the virtual-reality environment;
modifying the image to further comprise a chroma-key background inserted into the visual representation of the 3-D virtual scene, wherein the chroma-key background is positioned in the image such that when the image is displayed on the one or more display devices, the subject is seen against the chroma-key background from the view of a camera recording the subject;
displaying, on the one or more display devices, the image comprising the visual representation of the 3-D virtual scene with the chroma-key background inserted, such that the chroma-key background is visible on the one or more display devices; and
recording, using the camera, an image of the subject in the virtual-reality environment against the chroma-key background along with at least a portion of the one or more display devices.

2. The method of claim 1, wherein the visual representation comprises an interactive scene.

3. The method of claim 1, further comprising:
tracking a location of the subject in the virtual-reality environment;
determining a location in the 3-D virtual scene based on the location of the subject in the virtual reality environment; and
rendering the 3-D virtual scene from the perspective of the location in the 3-D virtual scene to generate the visual representation of the 3-D virtual scene.

4. The method of claim 1, wherein the image is recorded by the camera as the representation of the 3-D virtual scene is displayed on the one or more display devices.

5. The method of claim 1, wherein the chroma-key background covers at least a portion of the 3-D virtual scene when displaying the chroma-key background with the visual representation of the 3-D virtual scene.

6. The method of claim 1, further comprising:
detecting a change in a location of the subject in the virtual reality environment;
performing a real-time render of the 3-D virtual scene based on the change in the location of the subject in the virtual-reality environment; and
displaying, on the one or more display devices, an updated visual representation of the 3-D virtual scene based on the real-time render.

7. The method of claim 6, further comprising changing the location of the chroma-key background on the one or more display devices based on the detected change in the location of the subject in the virtual-reality environment.

8. The method of claim 1, further comprising:
extracting the image of the subject against the chroma-key background from the visual representation of the 3-D virtual scene;
inserting the extracted image of the subject into the 3-D virtual scene to create a frame for digital content.

9. The method of claim 8, wherein creating the frame for the digital media production comprises rendering the 3-D virtual scene and the extracted image to generate a 2-D rendered image.

10. The method of claim 1, wherein displaying the chroma-key background with the visual representation comprises interleaving the chroma-key background between displayed frames of the visual representation.

11. The method of claim 1, wherein displaying the chroma key background with the visual representation comprises displaying the chroma-key background on at least a portion of the one or more display devices that is visible to the camera.

12. A system comprising:
a virtual-reality environment comprising one or more display devices;
a camera;
and a computer system comprising one or more processors and a memory device having instructions stored thereon which, when executed by the one or more processors, cause the one or more processors to perform operations comprising:
generating, for display on the one or more display devices in the virtual-reality environment, an image comprising a visual representation of a 3-D virtual scene rendered from the perspective of a subject located in the virtual-reality environment;
modifying the image to further comprise a chroma-key background inserted into the visual representation of the 3-D virtual scene, wherein the chroma-key background is positioned in the image such that when the image is displayed on the one or more display devices, the subject is seen against the chroma-key background from the view of a camera recording the subject;
displaying, on the one or more display devices, the image comprising the visual representation of the 3-D virtual scene with the chroma-key background inserted, such that the chroma-key background is visible on the one or more display devices; and
recording, using the camera, an image of the subject in the virtual-reality environment against the chroma-key background along with at least a portion of the one or more display devices.

13. The system of claim 12, wherein the visual representation comprises an interactive scene.

14. The system of claim 12, wherein the instructions cause the one or more processors to perform further operations comprising:
receiving a location of the subject in the virtual-reality environment;
determining a location in the 3-D virtual scene based on the location of the subject in the virtual reality environment; and
rendering the 3-D virtual scene from the perspective of the location in the 3-D virtual scene to generate the visual representation of the 3-D virtual scene.

15. The system of claim 12, further comprising using the image of the subject in the virtual-reality environment to perform a motion capture of the subject.

16. The system of claim 12, wherein the instructions cause the one or more processors to perform further operations comprising:
- detecting a change in a location of the subject in the virtual reality environment;
- performing a real-time render of the 3-D virtual scene based on the change in the location of the subject in the virtual-reality environment; and
- displaying, on the one or more display devices, an updated visual representation of the 3-D virtual scene based on the real-time render; and
- changing the location of the chroma-key background on the one or more display devices based on the detected change in the location of the subject in the virtual-reality environment.

17. The system of claim 12, wherein displaying the chroma-key background with the visual representation comprises interleaving the chroma-key background between displayed frames of the visual representation.

18. The system of claim 12, wherein displaying the chroma key background with the visual representation comprises displaying the chroma-key background on at least a portion of the one or more display devices that is visible to the camera.

19. A non-transitory storage medium comprising instructions which, when executed by one or more processors, cause the one or more processors to perform operations comprising:
- generating, for display on one or more display devices in a virtual-reality environment, an image comprising a visual representation of a 3-D virtual scene rendered from the perspective of a subject located in the virtual-reality environment;
- modifying the image to further comprise a chroma-key background inserted into the visual representation of the 3-D virtual scene, wherein the chroma-key background is positioned in the image such that when the image is displayed on the one or more display devices, the subject is seen against the chroma-key background from the view of a camera recording the subject;
- displaying, on the one or more display devices, the image comprising the visual representation of the 3-D virtual scene with the chroma-key background inserted, such that the chroma-key background is visible on the one or more display devices; and
- recording, using the camera, an image of the subject in the virtual-reality environment against the chroma-key background along with at least a portion of the one or more display devices.

20. The non-transitory storage medium of claim 19, wherein the instructions cause the one or more processors to perform additional operations comprising:
- receiving a location of the subject in the virtual-reality environment;
- determining a location in the 3-D virtual scene based on the location of the subject in the virtual reality environment; and
- rendering the 3-D virtual scene from the perspective of the location in the 3-D virtual scene to generate the visual representation of the 3-D virtual scene.

* * * * *